United States Patent
Platzer et al.

(10) Patent No.: US 7,337,044 B2
(45) Date of Patent: Feb. 26, 2008

(54) DUAL/TRIPLEX FLIGHT CONTROL ARCHITECTURE

(75) Inventors: Jean-Paul Platzer, Ramonville (FR); Stephane Wanchu, Montreal (CA)

(73) Assignee: Thales Canada Inc., Ville Saint-Laurent (Quebec) (CA)

( * ) Notice: Subject to any disclaimer, the term of this patent is extended or adjusted under 35 U.S.C. 154(b) by 57 days.

(21) Appl. No.: 10/985,028

(22) Filed: Nov. 10, 2004

(65) Prior Publication Data
US 2006/0100750 A1 May 11, 2006

(51) Int. Cl.
*G01C 23/00* (2006.01)
(52) U.S. Cl. ............................................. 701/3; 701/33
(58) Field of Classification Search ...................... None
See application file for complete search history.

(56) References Cited

U.S. PATENT DOCUMENTS

| | | | | |
|---|---|---|---|---|
| 4,622,667 A | * | 11/1986 | Yount | 714/11 |
| 5,515,282 A | * | 5/1996 | Jackson | 701/4 |
| 5,550,736 A | * | 8/1996 | Hay et al. | 701/3 |
| 5,802,077 A | * | 9/1998 | Yeh | 714/797 |
| 5,984,504 A | * | 11/1999 | Doyle et al. | 700/108 |
| 7,263,630 B2 | * | 8/2007 | Sailer | 714/11 |
| 2005/0085957 A1 | * | 4/2005 | Yeh | 701/3 |

FOREIGN PATENT DOCUMENTS

DE 3906846 A1 * 9/1990

* cited by examiner

*Primary Examiner*—Michael J. Zanelli
(74) *Attorney, Agent, or Firm*—Lowe, Hauptman, Ham & Berner LLP

(57) ABSTRACT

A flight control computer for controlling an actuator responsive to a flight control command is described. The system includes a first, second, and third pair of processors. Three different processor types make up the three pairs of processors and the pairs of processors differ between all processor pairs. A method aspect of providing a robust flight control computer controlling actuator responsive to a flight control command includes arranging interconnected pairs of processors using different processor types such that the pairs of processors differ between all processor pairs. An identical flight control command is received at each processor pair. A processor pair is declared to be in failure and processing is transferred to another processor pair if the compared output of each processor pair after receiving the identical flight control command differs between the processors in the pair.

15 Claims, 2 Drawing Sheets

DUAL/TRIPLEX FLIGHT CONTROL ARCHITECTURE

FIELD OF THE INVENTION

The present invention relates to a robust flight control architecture using multiple different processors.

BACKGROUND

Responsive to pilot, autopilot, or other input commands, an aircraft flight control system controls the position of surfaces of the aircraft. In prior systems, control mechanisms, such as cabling and pulleys, and other mechanical linkages, provided the connection between input commands of a pilot and surfaces which the pilot desires to control. More recent systems replace the directly connected mechanical linkages with electrical controls signals transmitted between the pilot activated controls and the surfaces.

In one system, input commands converted to electrical control signals are transmitted along electrical connections, e.g. connecting wires, to surface actuators. Upon receipt of the electrical control signals representing the input commands, the surface actuators processe the control signals and control the surface, e.g., via hydraulic or other power or energy means. Such systems are commonly referred to as "fly-by-wire" flight control systems.

SUMMARY

The present invention provides a flight control computer architecture for controlling actuators responsive to flight control commands. The system includes a first, second, and third pair of processors. Three different processor types make up the three pairs of processors and the pairs of processors differ between all processor pairs.

A method aspect of providing robust flight control computers controlling actuators responsive to flight control commands includes arranging interconnected pairs of processors using different processor types such that the pairs of processors differ between all processor pairs. An identical flight control command is computed at each processor pair. A processor pair is declared to be in failure and processing is transferred to another processor pair if the compared output of each processor pair after receiving the identical flight control command differs between the processors in the pair.

Still other advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention.

DESCRIPTION OF THE DRAWINGS

The present invention is illustrated by way of example, and not by limitation, in the figures of the accompanying drawings, wherein elements having the same reference numeral designations represent like elements throughout and wherein.

DETAILED DESCRIPTION

In contrast with the above-described approaches, the mechanism of the present invention provides a robust flight control architecture.

Figure 1:
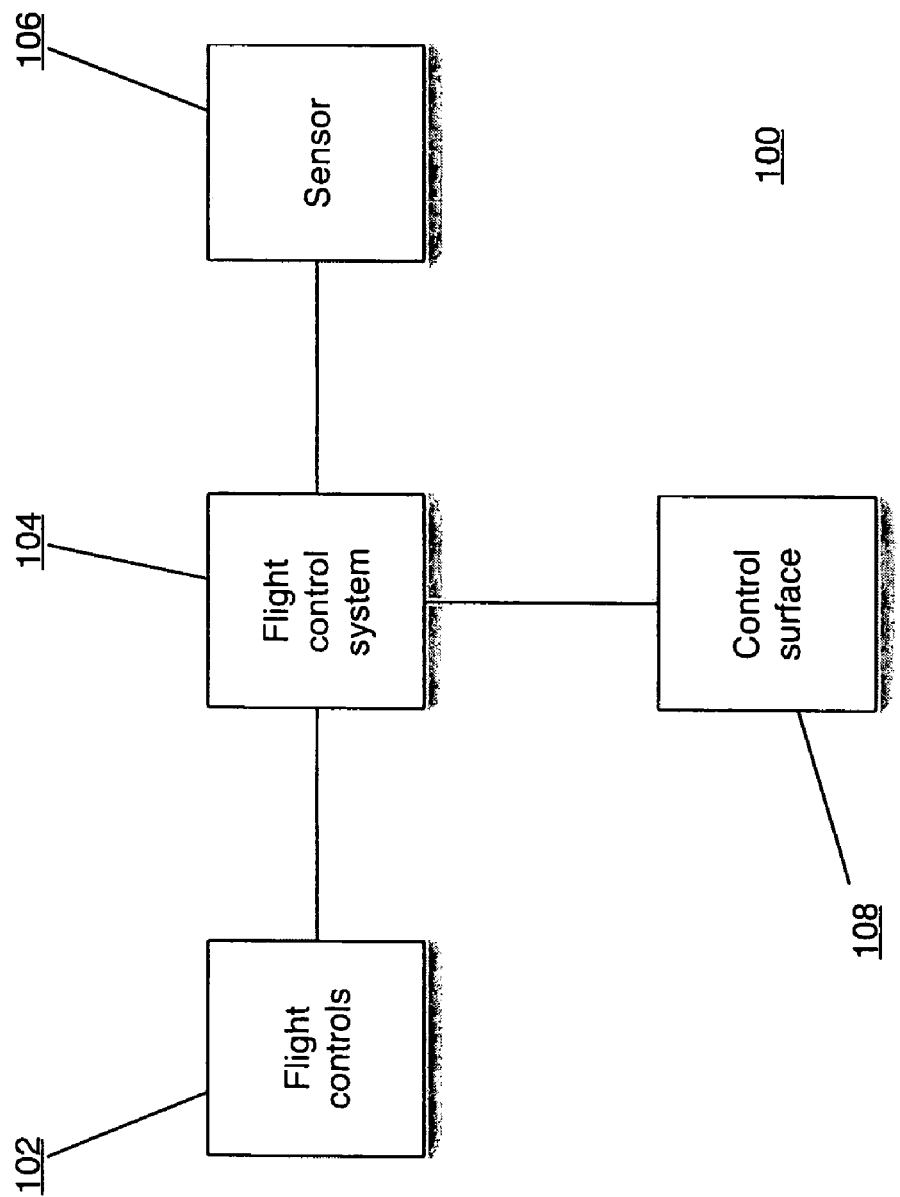
FIG. 1 is a high level block diagram of an aircraft control system useable in conjunction with an embodiment according to the present invention.

FIG. 1 depicts an aircraft control system 100 including flight controls 102 connected to a flight control system 104 for transferring input commands from a pilot, autopilot, or other control mechanism to a surface 108 via the flight control system. Sensors 106 are also connected to flight control system 104 in order to provide sensor inputs. Flight control system 104 processes the input received from the flight controls 102 and sensor 106 in order to determine an appropriate command signal to be transferred to surface 108.

Figure 2:
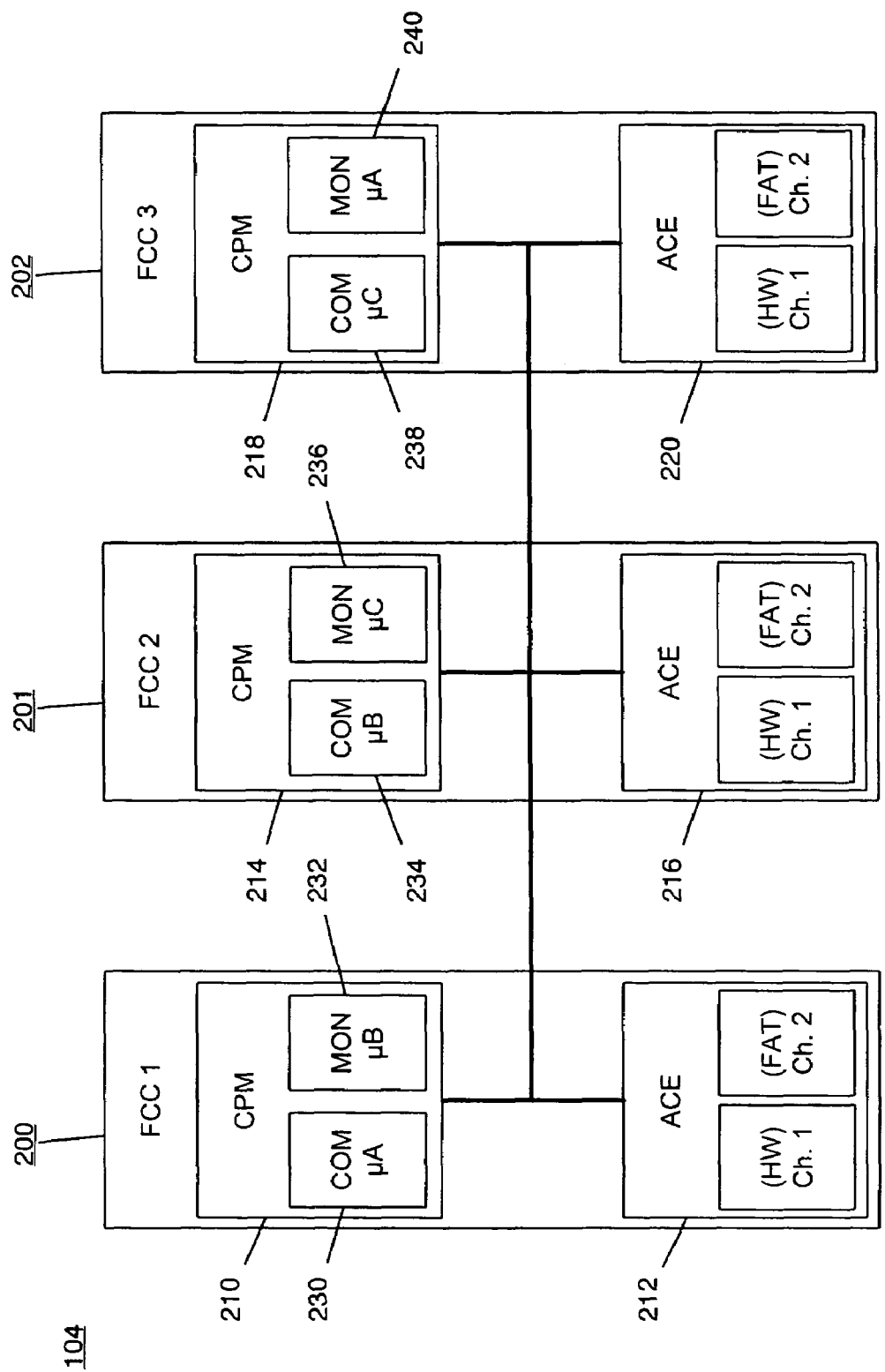
FIG. 2 is a high level block diagram of a flight control computer of FIG. 1 as used in an embodiment according to the present invention.

As described above, flight controls 102 include controls and devices to receive and transmit input commands received from a pilot, autopilot, or other control mechanism. In one embodiment, more than one flight control 102 may be arranged and connected to flight control system 104 in order to provide backup, redundant, and fail over command capability. Flight control system 104 (described in detail below with respect to FIG. 2) includes one or more flight control computers to receive input commands from flight controls 102 in the form of electrical signals and process the input commands to generate signals for controlling one or more actuators connected to a surface 108.

It is to be understood that there are one or more sensors 106 and surfaces 108 on the aircraft; however, for simplicity a single instance of each is described herein. Sensor 106 includes devices for monitoring aircraft and aircraft flight parameters, e.g., a gyroscope, an accelerometer, a surface 108 position monitor. Surface 108 includes devices for controlling the position of surfaces on the aircraft, e.g., rudder, aileron, elevator flap, spoiler, horizontal stabilizer, and other controls.

Flight control system 104 translates received input command signals from flight controls 102 to actuating signals for controlling a surface 108. Flight control system 104 is now described in further detail with reference to FIG. 2.

Flight control system 104 includes three interconnected flight control computers (FCC) 200, 201, 202. Each FCC 200, 201, 202 is similar in design and architecture with a primary difference being the selection of processor used. FCC 200, i.e., FCC 1, includes a central processing module (CPM) 210 for receiving and processing input commands and other signals, and actuator control electronics (ACE) 212 connected to CPM 210 arranged to receive processed commands from the CPM and produce actuator signals to be provided to surface 108. Additionally, ACE 212 receives signals from controls surface 108 which are provided to CPM 210. High level computations are handled by the CPMs in normal mode.

FCC 201 includes a CPM 214 similar (with exception to processors used as described in detail below) to CPM 210 and an ACE 216 similar to ACE 212 and FCC 202 includes a CPM 218 similar to CPMs 210, 214 and an ACE 220 similar to ACE 212, 216. Similar to the dual processing lanes of the CPMs 210, 214, 218, ACEs 212, 216, 220 include dual paths of dissimilar non-complex hardware for increasing survivability of the aircraft. The dual paths of the ACEs include a simple hardware design channel and a complex fully analyzable and testable hardware design. Through the dual paths, the ACEs provide a command interface between the processing lanes and the actuators and gather the actuator signals from the servos. The three CPMs 210, 214, 218, in conjunction with the corresponding ACEs 212, 216, 220, are interconnected and communicate with each other, e.g., using a dedicated point to point serial communications, a serial bus network (CAN, TTP, Arinc 429 or UBB), or other communication mechanism.

CPM 210 includes dual processing lanes, i.e., processing systems, referred to as a command lane 230 and a monitor lane 232. Command lane 230 and monitor lane 232 receive and process the same input such that if the same output is not generated an error or failure of the CPM 210, and consequently FCC 200, is determined to have occurred. Based on a failure determination of CPM 210, one or more of the remaining CPM 214, 218 will take over processing of the input signals previously processed by CPM 210. That is, monitor lane 232 acts as a check on the processing of command lane 230. In an alternate embodiment, command lane 230 monitors monitor lane 232 in a similar fashion.

Monitor lane 232 uses one of a number of methods for verifying the proper operation of command lane 230. In one embodiment, monitor lane 232 performs a comparison between its output and the output of command lane 230. If the output of command lane 230 and monitor lane 232 differs, monitor lane 232 determines invalid operation of command lane 230 and transmits an indicator of the failure of CPM 210 to the remaining CPMs 214, 218.

In order to further increase robustness of the above-described architecture, command lane 230 and monitor lane 232 each utilize different processors. For example, the different processors may be from different processor families, different processor designs, and/or different processor fabrication plants. The processor used in command lane 230 may be a POWERPC-based design obtained from a Motorola fabrication plant while the processor used in monitor lane 232 may be a POWERPC-based design obtained from an IBM fabrication plant.

Similar to the above-described approach used with respect to CPM 210, CPM 214 includes two processing lanes, i.e., command lane 234 and monitor lane 236. Command lane 234 and monitor lane 236 receive and process the same input similarly to command lane 230 and monitor lane 232 of CPM 210. Monitor lane 236 acts as a check on the processing of command lane 230 in the same manner as monitor lane 232 with respect to command lane 230.

Further similar to CPM 210, the processing lanes of CPM 214 utilize different processors. Again, the different processors may be from different processor families, a different processor designs, and/or different processor fabrication plants. Command lane 234 of CPM 214 uses the same processor as monitor lane 232 of CPM 210, whereas monitor lane 236 of CPM 214 uses a third processor different from either of the processors used in CPM 210.

Similarly, CPM 218 includes two processing lanes, i.e., command lane 238 and monitor lane 240, each utilizing different processors. Command lane 238 of CPM 218 uses the same processor has monitor lane 236 of CPM 214 and monitor lane 240 uses the same processor as command lane 230 of CPM 210. In this manner, three different processors are used in three different flight control computers FCC 200, 201, 202 in order to increase robustness.

By using three different processors arranged in dual configurations, the above described architecture is robust to the first generic failure of one of the individual processor's family. The failure survivability offers additional safety in flight and secures, for example, an autoland mode capability below 50 ft. in elevation.

Based on the above described architecture, if one of the processor family suffers a failure, a third CPM (and third FCC) will remain functional and operating by using a combination of the remaining two processor families. For example, if the processor in monitor lane 232 of CPM 210 fails due to a processor design flaw or fabrication flaw, the similar processor and command lane 234 of CPM 214 would be expected to fail. However, CPM 218 using a second and third different processor family and command lane 238 and command lane 240 would remain operational despite the failure of the first processor family.

The dual/triplex architecture described above operates in a normal mode as long as at least one CPM 210, 214, 218 is in a valid mode of operation and enough sensors provide valid data. The level of validity of the multi sensor inputs required to compute flight control functions is determined by a Failure Hazard Analysis performed at the aircraft level and refined at the system level.

After a loss of critical sensor data such as air data, the architecture degrades to a direct mode. In direct mode, ACEs are still in operation to drive the actuation. Direct mode computes commands in a more crude manner with sensor data available.

If all three CPMs 210, 214, 218 are invalid, flight control system 104 degrades to a backup mode in which fixed gains are applied to incoming command signals from flight controls 102 and then provided to surface 108.

It will be readily seen by one of ordinary skill in the art that the present invention fulfills all of the advantages set forth above. After reading the foregoing specification, one of ordinary skill will be able to affect various changes, substitutions of equivalents and various other aspects of the invention as broadly disclosed herein. It is therefore intended that the protection granted hereon be limited only by the definition contained in the appended claims and equivalents thereof.

What is claimed is:

1. A flight control system for controlling actuators responsive to a flight control command, the system comprising:

a first flight control computer having a first processor of a first processor type and a second processor of a second processor type;

a second flight control computer having a first processor of the second processor type and a second processor of a third processor type; and a third flight control computer having a first processor of the first processor type and a second processor of the third processor type, wherein the first flight control computer, second flight control computer, and third flight control computer are interconnected with each other and wherein the second processor of each flight control computer is arranged to determine valid operation of the first processor of the same flight control computer by comparison of the output of the first processor of the same flight control computer and output of the second processor, and wherein the first processor of each flight control computer is a command lane processor and the second processor of each flight control computer is a monitor lane processor.

2. The flight control system of claim 1, the second processor of the first flight control computer arranged to determine validity of the first processor of the first flight control computer.

3. The flight control system of claim 1, the second processor of each flight control computer is arranged to determine validity of the first processor of the corresponding flight control computer.

4. The flight control system of claim 1, each of the flight control computers being able to perform the processing of all the flight control computers.

5. The flight control system of claim 1, wherein one of the flight control computers remains operational after failure of all processors of the same processor type.

6. The flight control system of claim 5, wherein a fixed gain is applied to the flight control command to control the actuator after failure of all processors.

7. The flight control system of claim 1, wherein a fixed gain is applied to the flight control command to control the actuator after failure of all processors.

8. The flight control system of claim 1, wherein the second processor of each flight control computer is arranged to transmit a failure indication to each of the other flight control computers for each determination of invalid operation of the first processor of the same flight control computer.

9. A method of providing a robust flight control computer controlling actuator responsive to a flight control command, comprising the steps of:
- arranging interconnected pairs of processors using different processor types such that the pairs of processors differ between all processor pairs;
- receiving an identical flight control command at each processor pair; and
- declaring a processor pair in failure and transferring processing to another processor pair if the compared output of each processor pair after receiving the identical flight control command differs between the processors in the pair, wherein applying a fixed gain to the flight control command to control the actuator if all pairs of processors are declared in failure.

10. The method of claim 9, wherein there are three interconnected pairs of processors.

11. The method of claim 9, wherein there are three different processor types.

12. A flight control computer for controlling an actuator responsive to a flight control command, the system comprising:
- a first pair of processors;
- a second pair of processors;
- a third pair of processors, wherein three different processor types make up the three pairs of processors and the pairs of processors differ between all processor pairs, and
- wherein a first processor of each pair of processors is arranged to determine valid operation of a second processor of the same pair of processors by comparison of the output of the first processor and the output of the second processor, and
- wherein a fixed gain is applied to the flight control command to control the actuator after failure of all processors.

13. The flight control computer of claim 12, one of the processors of each of the pairs of processors arranged to determine validity of the other processor of the processor pair.

14. The flight control computer of claim 12, wherein one of the pair of processors remains operational after failure of all processors of the same processor type.

15. The flight control computer of claim 12, wherein the first processor of each pair of processors is arranged to transmit a failure indication to each of the other pairs of processors for each determination of invalid operation of the second processor of the same pair of processors.

* * * * *